UNITED STATES PATENT OFFICE.

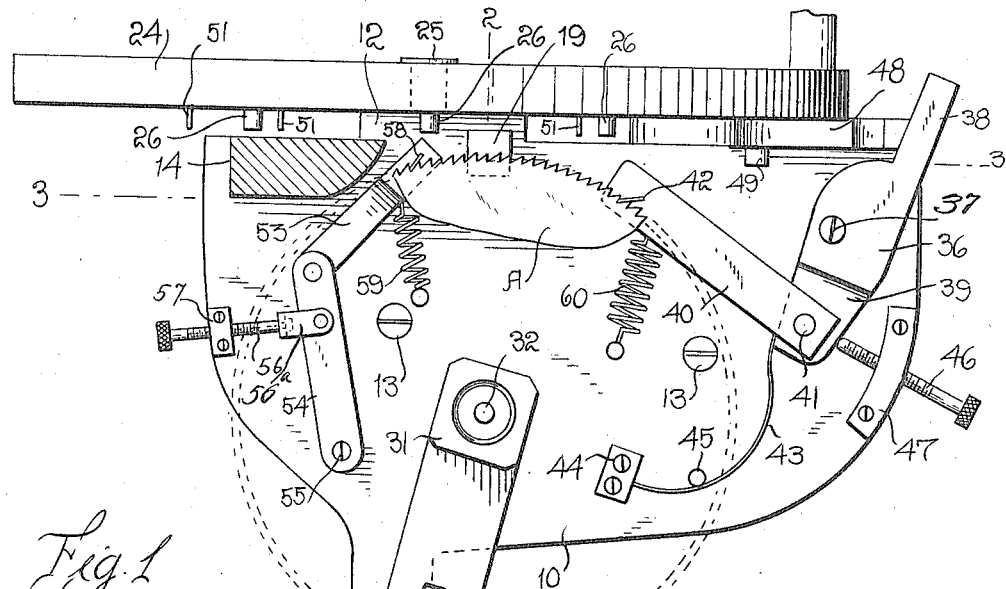

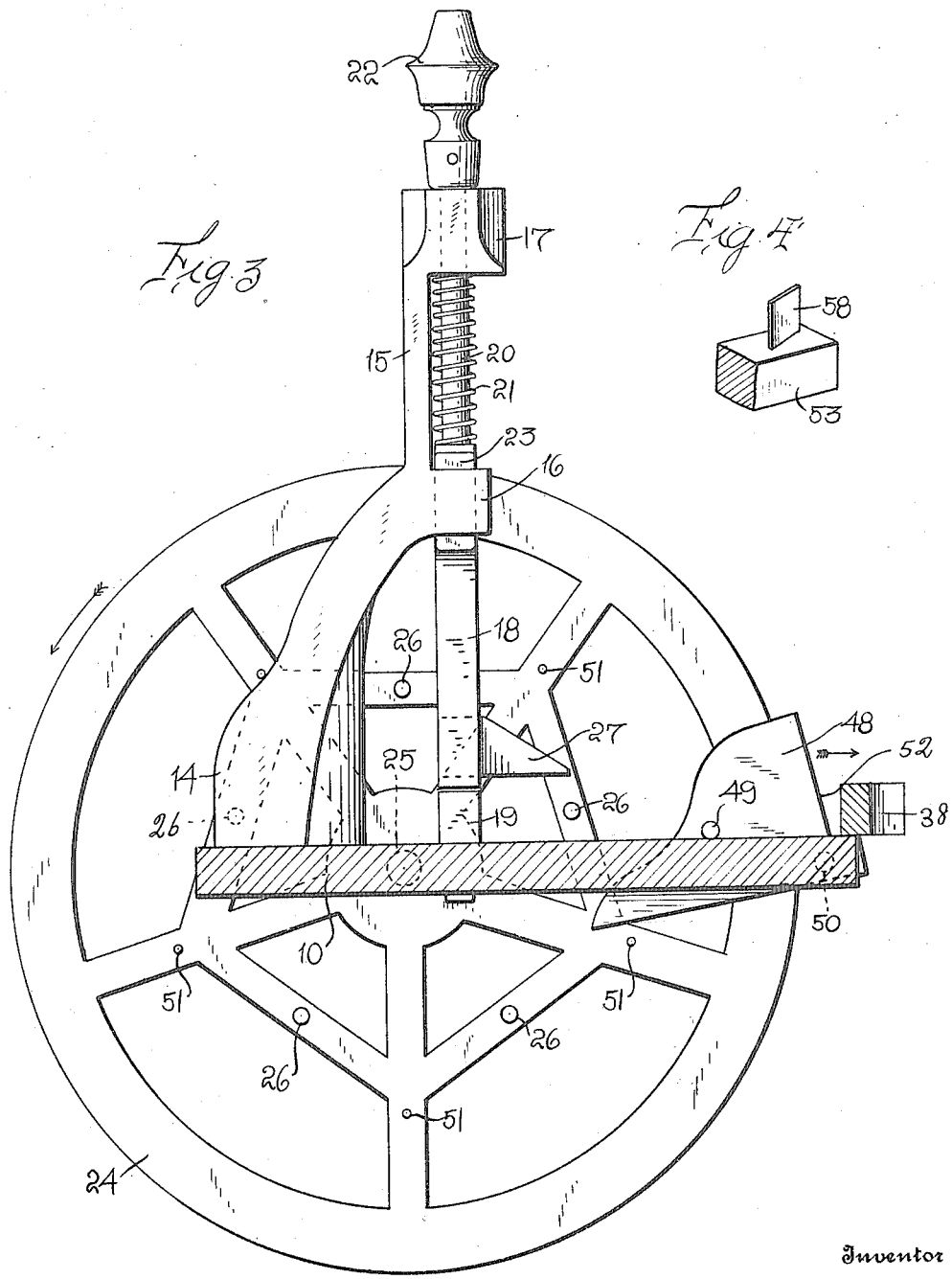

JAMES F. MORRISEY, OF MORGANTON, NORTH CAROLINA.

MEANS FOR SETTING CIRCULAR SAWS.

1,266,703.  Specification of Letters Patent.  Patented May 21, 1918.

Application filed July 9, 1917. Serial No. 179,537.

*To all whom it may concern:*

Be it known that JAMES F. MORRISEY, a citizen of the United States, residing at Morganton, in the county of Burke and State of North Carolina, has invented certain new and useful Improvements in Means for Setting Circular Saws, of which the following is a specification, reference being had to the accompanying drawings.

This invention relates to saw setting appliances, and particularly to means for setting the teeth of circular saws.

The general object of my invention is to provide very simple and effective means for setting the teeth of circular saws by hammering the teeth upon the anvil, so as to dispose them in the same plane as the body of the saw.

A further object is to provide a machine of this character in which provision is made for supporting the saw for rotation between a plunger or hammer and an anvil, further provision being made whereby, as the plunger-like hammer is reciprocated, the saw will be given a step by step rotary movement so as to bring all its teeth, one by one beneath the hammer.

A further object is to provide means for adjusting the feed of the saw.

Another object is to prevent a reverse rotation of the saw in a direction opposite to that in which it is being fed or turned.

Another object is to so construct the machine that saws of various diameters may be set.

A further object is to provide improved means for reciprocating the plunger or hammer and to provide a mechanism of this character which may be readily put in place, readily operated and which is particularly adapted for setting the teeth of relatively small circular saws.

Other objects will appear in the course of the following description.

My invention is illustrated in the accompanying drawings, wherein:—

Figure 1 is a top plan view of my invention, the standard 14 being in section;

Fig. 2 is a section on the line 2—2 of Fig. 1;

Fig. 3 is a section on the line 3—3 of Fig. 1; and

Fig. 4 is a fragmentary perspective view showing the pawl 53 and the blade 58;

Fig. 5 is a side elevation of an anvil 19 and the hammer or plunger 18, showing the manner in which the plunger and anvil are formed in order to set an angular saw tooth;

Fig. 6 is a face view of the lower end of the plunger 18, showing the end of the plunger reduced when it is desired that the plunger shall strike only one tooth at a time, as where the teeth are to be bent by the means illustrated in Fig. 5.

Referring to these drawings, it will be seen that my improved saw setting appliance comprises a table, designated 10, which is approximately semi-circular in form. This table has a lateral extension 11 and the table and the extension are adapted to be clamped or fastened down upon a work bench or other support in any suitable manner, as by screws 13. The straight edge of the table is cut away so as to provide a medially disposed extended portion 12, the purpose of which will be later stated.

Extending upward from the table, adjacent the straight edge thereof, and in one corner of the table, is the arm or standard 14, which extends over to a point above the middle portion of the table and is then extended upward as at 15 and provided with the laterally extending collars 16 and 17 having rectangular passages passing through them. Operating within these collars is a plunger 18, which reciprocates within the collars 16 and 17, this plunger coacting with an anvil 19, mounted upon the table 10 at the straight edge thereof. The upper portion of the plunger is reduced as at 20 and disposed between the collars 16 and 17 is a coiled compression spring 21, which urges the plunger downward. The plunger at its upper end may be provided with any suitable handle or other terminal end 22. The lower collar carries within it, the wear piece 23, which may be renewed from time to time, so as to take up wear and prevent the plunger from getting out of proper alinement with the anvil.

For the purpose of reciprocating the plunger, I provide a wheel 24, which is rotatably mounted upon a spindle or other suitable bearing 25, which is mounted in the extension 12. This wheel may be provided with a handle or any other suitable means whereby it may be rotated either manually or by power. The wheel carries upon it at spaced intervals, a plurality of inwardly projecting studs 26 and the plunger has a laterally projecting lug 27 with which these studs 26 successively engage, as the wheel is rotated.

It is obvious now that as the wheel is rotated in a counter-clockwise direction, the studs will strike the under face of the lug 27 and lift the plunger and that as soon as one pin or stud 26 has escaped the lug 27, the spring 21 will urge the plunger downward against the anvil.

As a means for supporting a circular saw A upon the table 10, I provide an arm 28, which is longitudinally slotted as at 29, there being a bolt 30 passing through this slot and into the arm 11. Thus the arm 28 may be longitudinally and rotatably adjusted. Upon the inner end of the arm 28 there is an upwardly extending head 31, which is annular in form and extending upward from this head is the central spindle 32, which is smaller in exterior diameter than the interior diameter of the head and surrounding this spindle is a centering bushing 33, which is held down upon the saw and projected through the center opening of the saw by means of a spring 34, which is, in turn, held compressed upon the centering bushing by means of a transverse pin 35, which is removable.

For the purpose of rotating the saw A step by step concentrically to the spindle 32, I provide mechanism which constitutes a pawl engaging with the ratchet like teeth of the saw and provide means whereby this pawl may be reciprocated or oscillated. To this end I pivotally mount upon the table at the end thereof opposite the standard 14 a lever 36, the pivot pin of which is designated 37, and the lever having a finger 38 projecting rearward beyond the rear edge of the table. The upper face of the forward end of the finger is reduced as at 39 and mounted thereon is the member 40, which constitutes a pawl. This member is connected to the lever by means of the pivot 41 and at its free end is provided with the upwardly extending blade 42, which is disposed in a plane approximately parallel to the plane of rotation of the wheel 24. Urging the forward end of the lever outward and, therefore, acting to retract the pawl 40 is a flat spring 43, one end of which is held in place by means of a clip 44, this spring being placed under tension by passing around a hinge 45, the free end of the spring bearing against the forward extremity of the lever 36. A stop screw 46 passes through a wall 47, which extends along the edge of the table just forward of the lever 36 and which is held rigidly in place, this stop screw limiting the outward movement of the forward end of the lever 36 and limiting the retraction of the pawl 40.

For the purpose of oscillating the lever 36, I pivot upon the rear edge of the table, a member 48, which is approximately triangular in form and which carries the forwardly projecting stop 49. The lever is pivoted at 50 and is, of course, disposed parallel to the plane of rotation of the wheel 24. The wheel 24 carries pins 51 on it at spaced distances so arranged that these pins will successively strike the inwardly extending end of the lever 48 and will lift the lever so that the upwardly extending edge 52 will strike the finger 38, as the lever is oscillated in the direction of the arrow, Fig. 3, thus forcing the finger outward, forcing the opposite end of the lever inward and forcing the pawl inward a predetermined distance.

It will be seen now that as the wheel 24 is rotated, the pawl 40 will be reciprocated and that the blade 42 engaging with the ratchet toothed edge of the saw will cause the saw to be given a step by step rotation beneath the hammer or plunger.

For the purpose of preventing a reverse movement of the saw, I provide a pawl 53, which is operatively supported upon a member 54, which is adjustably mounted. Thus the member 54 is pivoted at 55 upon the table and is shifted by an adjusting screw 56 swiveled to a yoke 56ᵃ and passing through a wall 57 on the table. The pawl 53 is pivoted to the extremity of the member 54 and extends toward the anvil 19 and is provided with an upwardly extending blade 58, which corresponds in function to the blade 42, but is inclined in a plane angular to the direction of rotation of the wheel 24. A spring 59 urges the pawl toward the spindle 32. A spring 60 is attached to the free end of the pawl 40 and urges the free end of this pawl inward toward the spindle 32. Thus both of these blades 42 and 58 are urged into contact with the teeth of the saw.

In the practical use of this device, the saw is disposed upon the spindle 32 and then the arm 28 is adjusted so that the teeth of the saw will rest upon the anvil 19. Under these circumstances the blade 42 will engage the teeth of the saw and the blade 58 may be adjusted so as to properly engage these teeth. After the saw is put in place and properly centered by the centering member 33, the wheel 24 is rotated which will, as before explained, cause the intermittent lifting of the plunger or hammer, the spring 21 acting to throw the plunger or hammer downward with force against the saw supported upon the anvil 19. While the plunger is moving upward, a pin 51 will strike the lever 48, rotating it in the direction of the arrow, Fig. 3, and shifting the pawl 40 inward, thus giving a rotation to the saw of a certain predetermined amount. The amount of this rotation is dependent upon the adjustment of the screw 46. If this screw is thrown fully outward, the pawl 40 will have a relatively long range of movement. If, on the other hand, the screw 46 is turned inward, the lever 38 will be held spaced from the edge 52 of the lever 48 and, as a consequence, a portion of the motion of the lever 38 will not be communicated to the lever 36 and, therefore, the movement of the pawl will be less.

One machine of the character described may be used for saws having quite a range of diameters as it is obvious that the spindle 32 may be adjusted to suit the diameter of the saw. The member 33 centers the saw accurately upon the spindle, as well as clamps it firmly in position.

While I have illustrated certain details of construction, I wish it understood that these details may be varied in many different ways without departing from the scope of the claims.

While I have illustrated in Figs. 2 and 3 a hammer or plunger having a flat under face and an anvil having a flat upper face which would tend to force the teeth into a common plane, it is to be understood that this is purely illustrative and that where it is desired to set the teeth so that they shall be disposed at an angle to the plane of the saw, the anvil 19, as illustrated in Fig. 5, is formed with an angular upper surface, while the plunger 18 is reduced at its lower end and formed with an angular under face. The reason for reducing the lower end of the plunger is so that the plunger will only engage with one tooth at a time; in other words, the tooth which has to be bent. Under these circumstances, of course, the pawl 40 and its allied parts will be so set as to give a movement of two steps to the saw for each reciprocation of the plunger. In Fig. 5 I have also illustrated the anvil as being detachably engaged with the base 10, so that anvils having different angular faces may be substituted one for another.

Having thus described my invention, what I claim is:—

1. Means for setting circular saws including an anvil, a reciprocatably mounted hammer, a saw support permitting rotary movement of the saw with its edge across the face of the anvil, and means for reciprocating the hammer, means engaging the teeth of the saw and actuated by said means for reciprocating the hammer, feeding the saw step by step across the anvil and being actuated when the hammer is raised.

2. Means for setting circular saws including an anvil, a reciprocatably mounted hammer, a spindle upon which the saw is rotatably mounted with its margin disposed over the anvil, a rotatable member having means thereon engaging the hammer to lift it intermittently as the member is rotated, a spring urging the hammer downward, and means actuated by the rotatable member when the hammer is raised giving a step by step movement to the saw and engaging the saw teeth.

3. Means for setting circular saws including an anvil, a reciprocatably mounted hammer, a spindle upon which the saw is rotatively mounted with its margin disposed over the hammer, means engaging the hammer and lifting it intermittently, a spring urging the hammer downward, a pawl engaging the teeth of the saw, means actuated by the hammer reciprocating means for oscillating said pawl to thereby give a step by step motion to the saw, and means for limiting the range of movement of the pawl to thereby control the feed of the saw.

4. Means for setting saws including a table, an anvil, mounted thereon, a saw supporting spindle mounted upon the table and rotatably supporting the saw with its margin disposed on the anvil, a wheel having a plurality of projecting studs, a lug on the hammer with which said studs successively engage to lift the hammer, a spring urging the hammer downward against the anvil, a reciprocating pawl engaging the teeth of the saw, and means actuated by said wheel for reciprocating the pawl to thereby feed the saw step by step.

5. Means for setting saws including a table, an anvil mounted thereon, a saw supporting spindle mounted upon the table and rotatably supporting the saw with its margin disposed on the anvil, a wheel having a plurality of projecting studs, a lug on the hammer with which said studs successively engage to lift the hammer, a spring urging the hammer downward against the anvil, a reciprocating pawl for engaging the teeth of the saw, and means actuated by said wheel for reciprocating the pawl to thereby feed the saw step by step, and means for adjusting the length of movement of said pawl.

6. Means for setting circular saws including a table, an anvil carried thereby, a hammer reciprocatively mounted above the anvil, a saw support, a pawl reciprocatively mounted and engaging with the teeth of the saw to rotate it in one direction across the face of the anvil, means for engaging the teeth of the saw and preventing a reverse movement of the saw, means for reciprocating the hammer and said pawl, said means carrying a member operatively engaging the pawl to shift it, and means controlling the amount of movement of the pawl.

7. Means for setting circular saws including a table, an anvil thereon, a hammer reciprocatably mounted above the anvil, a saw supporting spindle operatively mounted upon the table for adjustment toward or from the anvil, a feeding pawl engageable with the saw teeth, a pawl engageable with the saw teeth and preventing reverse movement of the saw, means for adjusting said last named pawl to accommodate saws of different diameters, means for reciprocating the hammer, said means operatively engaging said feeding pawl to reciprocate it, and means for adjustably limiting the range of movement of the feeding pawl.

8. Means for setting saws including a table having an anvil, a hammer reciprocatively mounted above the anvil, means for supporting the saw comprising a longitudinally slotted arm having at one end a head and a spindle upon which the saw is mounted for rotation, an adjusting bolt passing through the slot of said arm and holding the arm in adjusted positions, and means for reciprocating the hammer and giving a step by step rotation to the saw across the face of the anvil.

9. Means for setting circular saws including a table having an anvil, and a standard extending upward over the anvil and formed with guides, a plunger moving in said guides and confronting the anvil, a spring urging the plunger toward the anvil, the plunger having a laterally projecting lug, a wheel having studs intermittently engaging the lug as the wheel is rotated to thereby shift the plunger outward, a saw supporting spindle operatively carried upon the table, a pawl engaging the teeth of the saw, said wheel having pins at spaced distances operatively and intermittently engaging the pawl to shift it in a direction to feed the saw across the face of the anvil, and means for preventing a reverse rotation of the saw.

10. Means for setting circular saws including a table having an anvil, a standard mounted on the table and having guides disposed above the anvil, a hammer reciprocating in said guides, a spring urging the hammer against the anvil, the hammer having a laterally projecting lug, a wheel mounted upon the table and having a plurality of studs intermittently engaged with the lug to lift the hammer, a lever pivotally mounted upon the table and having a finger extending beyond the periphery of the wheel, a pawl pivoted to said lever and extending toward the anvil and having a blade adapted to engage with the teeth of the saw, a spring urging the pawl outward, a lever mounted upon the table parallel to the wheel and having one edge engageable with the finger, and means on the wheel intermittently engaging said lever to shift it to thereby oscillate the lever and the pawl carried thereby.

11. Means for setting circular saws including a table having an anvil, a hammer reciprocatably mounted above the anvil, means for reciprocating the hammer, means on the table for rotatably supporting a saw, a lever pivotally mounted upon the table, means on the hammer reciprocating means for oscillating said lever, a pawl pivoted to the lever and extending toward the anvil and having a blade adapted to engage with the teeth of the saw, a spring urging the pawl outward in a direction reverse to the direction of movement of the saw, a spring urging the pawl into engagement with the saw, and a stop adjustable toward or from the adjacent end of the lever and pawl to limit the movement of the pawl under the action of the first named spring.

12. Means for setting circular saws including a table having an anvil, a hammer reciprocatably mounted above the anvil, and a saw support having a head formed with an annular upwardly extending flange, the inner face of said flange being convergent downward, a pin extending upward through said head above the flange, and a centering bushing slidingly mounted upon the pin and downwardly tapered, and a spring urging the bushing toward the head.

In testimony whereof I hereunto affix my signature in the presence of two witnesses.

JAMES F. MORRISEY.

Witnesses:
J. R. TAYLOR,
J. H. KINCAID.